(12) United States Patent
Plate (10) Patent No.: US 11,853,422 B2
(45) Date of Patent: Dec. 26, 2023

(54) DETECTING MALICIOUS COMPONENTS USING COMMIT HISTORIES

(71) Applicant: SAP SE, Walldorf (DE)

(72) Inventor: Henrik Plate, Valbonne (DE)

(73) Assignee: SAP SE, Walldorf (DE)

( * ) Notice: Subject to any disclaimer, the term of this patent is extended or adjusted under 35 U.S.C. 154(b) by 635 days.

(21) Appl. No.: 16/712,514

(22) Filed: Dec. 12, 2019

(65) Prior Publication Data

US 2021/0182391 A1 Jun. 17, 2021

(51) Int. Cl.
| | | |
|---|---|---|
| *G06F 21/56* | (2013.01) | |
| *G06F 8/71* | (2018.01) | |
| *G06N 20/00* | (2019.01) | |
| *G06N 7/01* | (2023.01) | |

(52) U.S. Cl.
CPC .............. *G06F 21/565* (2013.01); *G06F 8/71* (2013.01); *G06N 7/01* (2023.01); *G06N 20/00* (2019.01); *G06F 2221/033* (2013.01)

(58) Field of Classification Search
CPC .... G06F 21/565; G06F 8/71; G06F 2221/033; G06N 20/00; G06N 7/005
See application file for complete search history.

(56) References Cited

U.S. PATENT DOCUMENTS

2003/0229707 A1* 12/2003 Sharon .................... H04L 67/06
709/230
2014/0101177 A1* 4/2014 Saito ...................... G06F 16/215
707/755
2017/0251003 A1* 8/2017 Rostami-Hesarsorkh ...................
G06N 5/01
2018/0121650 A1* 5/2018 Brown .................. G06F 21/561
2019/0286115 A1* 9/2019 Wang ....................... G09G 5/14
(Continued)

OTHER PUBLICATIONS

Anonymous, "About Vulnerability-Assessment-Tool", retrieved from https://sap.github.io/vulnerability-assessment-tool/about/, 2 pages.
(Continued)

*Primary Examiner* — Ashokkumar B Patel
*Assistant Examiner* — William B Jones
(74) *Attorney, Agent, or Firm* — Fountainhead Law Group P.C.

(57) ABSTRACT

Embodiments detect malicious code in distributed software components. A detector element references a source code repository (e.g., open source, commercial) containing lines of various files of a distributed artifact. Subject to certain possible optimizations, the detector inspects the individual files and lines of the artifact file-by-file and line-by-line, to identify whether any commit history information is available from a Versioning Control System (VCS). A risk assessor element receives from the detector element, results identifying those lines and/or files for which no VCS commit history is available. The risk assessor then references code features (e.g., file extension, security-critical API calls) in the results, to generate a probability of the malicious nature of the source code lacking VCS commit history information. An analysis report including this probability and additional relevant information, is offered to a user to conduct further manual review (e.g., to detect false positives attributable to benign/legitimate source code modification).

20 Claims, 6 Drawing Sheets

(56) References Cited

U.S. PATENT DOCUMENTS

2021/0029108 A1* 1/2021 Obando Chacon ..... G06F 21/62

OTHER PUBLICATIONS

Bertus, "Detecting Cyber Attacks In The Python Package Index (PyPI)", Oct. 13, 2018, 6 pages.
Anonymous, "OWASP Dependency Check", dated Oct. 16, 2019, retrieved from https://www.owasp.org/index.php/OWASP_Dependency_Check, 2 pages.
Anonymous, "OWASP—The Ten Most Critical Web Application Security Risks", retrieved from https://owasp.org, 25 pages.
Perica, et al., "Suppy Chain Malware—Detecting Malware In Package Manager Repositories", Jul. 17, 2019, 8 pages. Retrieved from https://blog.reversinglabs.com/blog/supply-chain-malware-detecting-malware-in-package-manager-repositories.

* cited by examiner

DETECTING MALICIOUS COMPONENTS USING COMMIT HISTORIES

BACKGROUND

Unless otherwise indicated herein, the approaches described in this section are not prior art to the claims in this application and are not admitted to be prior art by inclusion in this section.

Software supply chain attacks are commonly characterized by compromising a software vendor's development, build, or distribution infrastructure, in order to inject malicious code into legitimate software applications or updates. The infected software artifact may have a valid digital signature of the respective vendor, and can be obtained by end-users through trusted distribution channels.

A different variety of supply chain attack has emerged in recent years. Rather than directly compromising a software vendor's infrastructure, attacks on re-used components (e.g., software libraries) aim at compromising all downstream applications who directly or transitively use or include such an infected component available from a repository (e.g., an open source repository or a commercial repository).

SUMMARY

Embodiments relate to apparatuses and methods to detect malicious code in distributed software components. A detector element references a Versioning Control System (VCS) that manages the source code of the respective artifact (e.g., an open source or commercial software library), that contains the lines of various source code files of the artifact. Subject to certain possible optimizations, the detector inspects the individual files and lines of a distributed artifact file-by-file and line-by-line, to identify whether any corresponding commit history information is available from the respective VCS. A risk assessor element receives results from the detector element, identifying those lines and/or files for which no VCS commit history is available. The risk assessor then references code features (e.g., file extension, security-critical API calls) in the results, to generate a probability of the malicious nature of the code lacking VCS commit history information. An analysis report including this probability and additional relevant information, is offered to a user to conduct further manual review (e.g., to detect false positives attributable to benign/legitimate source code modification).

The following detailed description and accompanying drawings provide a better understanding of the nature and advantages of various embodiments.

DETAILED DESCRIPTION

Described herein are methods and apparatuses implementing the detection of malicious components. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Software supply-chain attacks relying upon components stored in a repository (e.g., open source or commercial), may be facilitated by the ever-increasing adoption of such components, and also the prevalence of dependency managers which resolve dependency declarations in an automated fashion. Such attacks abuse the developers' trust in the authenticity of packages hosted on external servers, and their adoption of automated build systems that encourage this practice.

An overall attack surface may comprise both technical infrastructures and development workforces. Hence, software that is composed of dozens or even hundreds of open source components may exhibit significantly larger exposure than software developed by a single vendor.

The potential reach of a software supply-chain attack is also larger when attacking upstream components. As compared to the infection of a single software artifact when infiltrating the infrastructure of just one software vendor, many more downstream dependents may be infected when attacking upstream components.

It is further noted that open source communities are, by definition, open to contributions. This can give rise to numerous social engineering attacks.

Embodiments relate to apparatuses and methods to detect malicious code in distributed software components. A detector element references a Versioning Control System that manages the source code of the respective artifact (e.g., an open source or commercial software library), that contains the lines of various source code files of the artifact. Subject to certain possible optimizations, the detector inspects the individual files and lines of a distributed artifact file-by-file and line-by-line, to identify whether any corresponding commit history information is available from the respective VCS. A risk assessor element receives results from the detector element, identifying those lines and/or files for which no VCS commit history is available. The risk assessor then references code features (e.g., file extension, security-critical API calls) in the results, to generate a probability of the malicious nature of the code lacking VCS commit history information. An analysis report including this probability and additional relevant information, is offered to a user to conduct further manual review (e.g., to detect false positives attributable to benign/legitimate source code modification).

Figure 1:
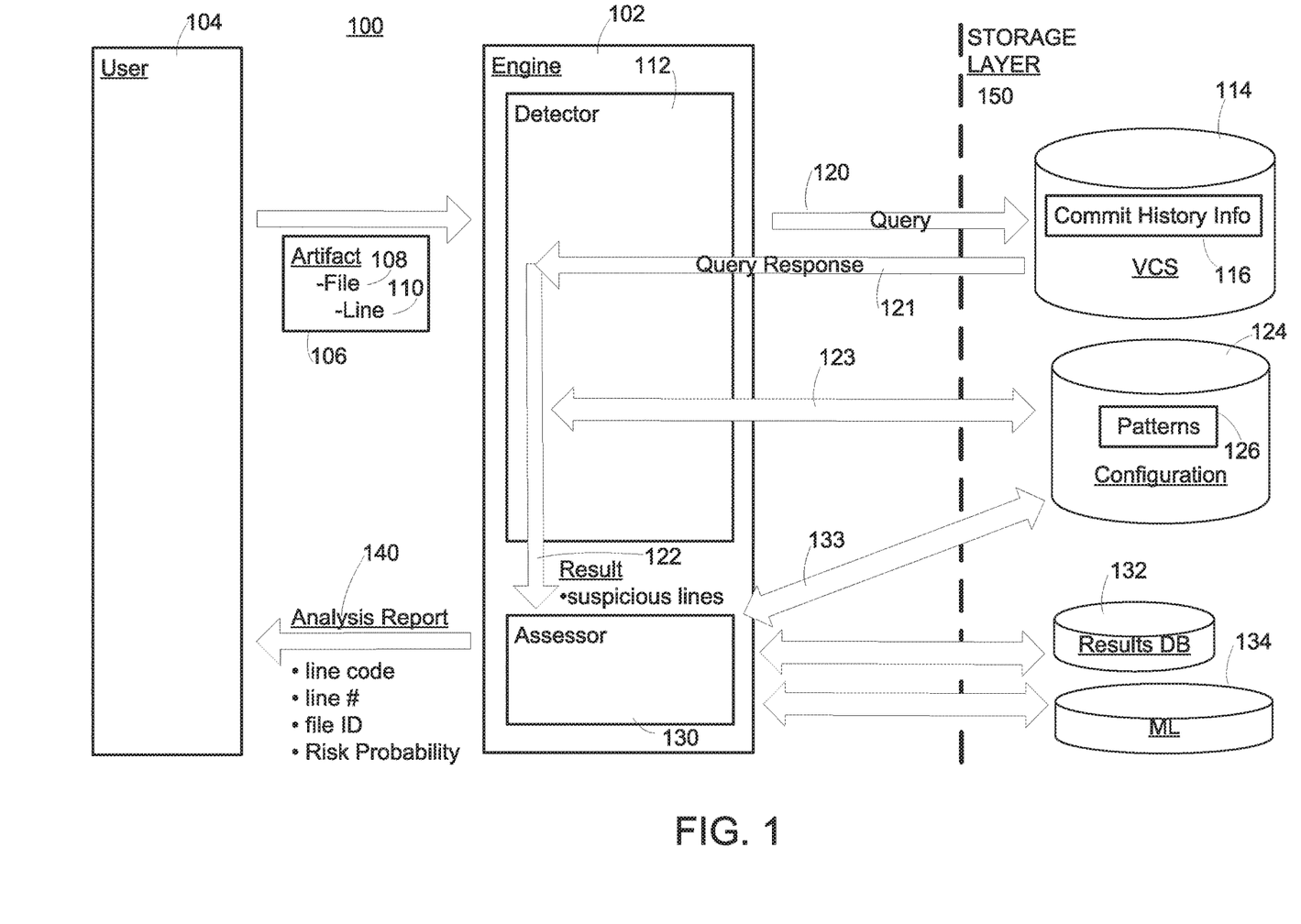
FIG. 1 shows a simplified diagram of a system according to an embodiment.

FIG. 1 shows a simplified view of an example system that is configured to implement detection of malicious software according to an embodiment. Specifically, system 100 comprises an engine 102 configured to receive (e.g., from a user 104) a software artifact 106 comprising files 108 made up of individual lines of code 110.

In response to receiving the artifact, a detector element 112 of the engine is configured to reference a Version Control System (VCS) 114. The VCS stores commit history information 116 on a per-file and per-line basis where known.

This commit history may comprise specific details regarding prior changes to a particular line of code present in a software repository (e.g., open source repository or commercial repository). Examples of such details can include the name of the party making a particular change, the line no. of the file, and the date a change was made.

Embodiments recognize that changes to code stored in the commit history, are generally reflective of the natural implementation and evolution of benign software. By contrast, the complete absence of any commit history whatsoever for a particular line of code included in a distributed artifact, may serve as a preliminary indication of malicious properties.

Accordingly, in response to receiving the artifact, the detector element of the engine issues a query 120 to the VCS based upon a line in a file of the distributed artifact. Then, the detector element receives a corresponding query response 121 with the commit history information for that line of code (if any).

Where some commit history information is returned by the query response, the line of software code has passed the initial screening, and is deemed likely to be non-malicious.

Where, however, no commit history information at all is returned to the detector element from the VCS, the line of code is deemed initially suspicious. That suspicious code line is added to a result 122 to be passed on to the assessor element 130 of the engine.

According to certain embodiments, some additional screening may take place before a suspicious line of code is included in the result. In particular, the detector element may consult 123 a configuration database 124 containing additional information relating to malicious code. For example, the configuration database may include patterns 126 indicative of the maliciousness of un-versioned software code.

The detector element proceeds to query the VCS for commit history information line-by-line, and file-by-file, for each artifact. Lines lacking any commit history information are added to the result.

Next, the detector element communicates the result to the assessor element 130. That assessor element may make an initial determination of probability of the risk of malicious content, by referencing a results database 132 storing previous results.

The assessor component may perform further analysis of the suspicious code within the result, to generate a risk probability for suspicious code. For example, the assessor may examine the code itself for the presence of one or more of:
  file extensions known to contain executable code,
  security-critical API calls, or
  obfuscation techniques that can be employed by attackers in order to evade detection.

In one possible example, assessment of a line of code initially deemed suspicious (by virtue of lack of any commit history) may reveal that code to be a non-executable (e.g., a comment in a source code file). Thus, the assigned probability of that code being malicious, would be low.

By contrast, the assessor's consultation 133 of the configuration database, could reveal the suspicious line of code to be part of a pattern generally indicative of malicious content. There, the assigned risk probability of the code being malicious, could be higher.

In some embodiments, the assessment phase may even be implemented through reference to machine learning (ML) data 134. A ML training set may include instances of code known to be malicious, thus allowing for an evolving assessment of malicious risk.

Following the assessment phase, the engine communicates to the user, an analysis report 140. That analysis report lists the lines of code deemed suspicious by virtue of their lack of any commit history. The content of the analysis report may include one or more of:
  the code itself of the suspicious line;
  the line number of the suspicious line of code;
  an identifier (and/or name) of the file in which the suspicious line of code appears; and
  the generated probability of risk that the suspicious line of code is malicious.

The analysis report may include certain functions enhancing its value to a user. For example, the analysis report may include aggregation and/or filtering. This can permit grouping together of suspicious lines of code from the result, which exhibit some sort of commonality (e.g., they are all located in a particular file of the artifact, or they are part of a continuous set of lines).

It is noted that a variety of reasons may exist for benign/legitimate lines of code to lack any commit history.

Accordingly, upon presentation of the analysis report, the user would likely conduct a further manual review of the suspicious lines of code identified. Such manual review could serve to weed out any potentially false positive outcomes.

While the particular embodiment of FIG. 1 shows each of the VCS, configuration database, results database, and machine learning data as being located in a same storage layer 150, this is not required. One or more of these elements could be present in different storage layers located remote from the others (e.g., accessed over a network).

And while the particular embodiment of FIG. 1 shows the detector as querying the VCS line-by-line to determine the (non-existence) of commit history, this is not required.

Specific embodiments may permit querying of the VCS on a file-by-file basis.

In particular, the contents of an entire file may be uniquely and unequivocally represented by a corresponding cryptographic digest (e.g., a SHA1 hash). Thus where available, a file's cryptographic digest (rather than each line of the file) may be referenced according to an optimization, reducing the burden on processing and networking resources.

Such an approach is discussed later below in connection with the example.

Figure 2:
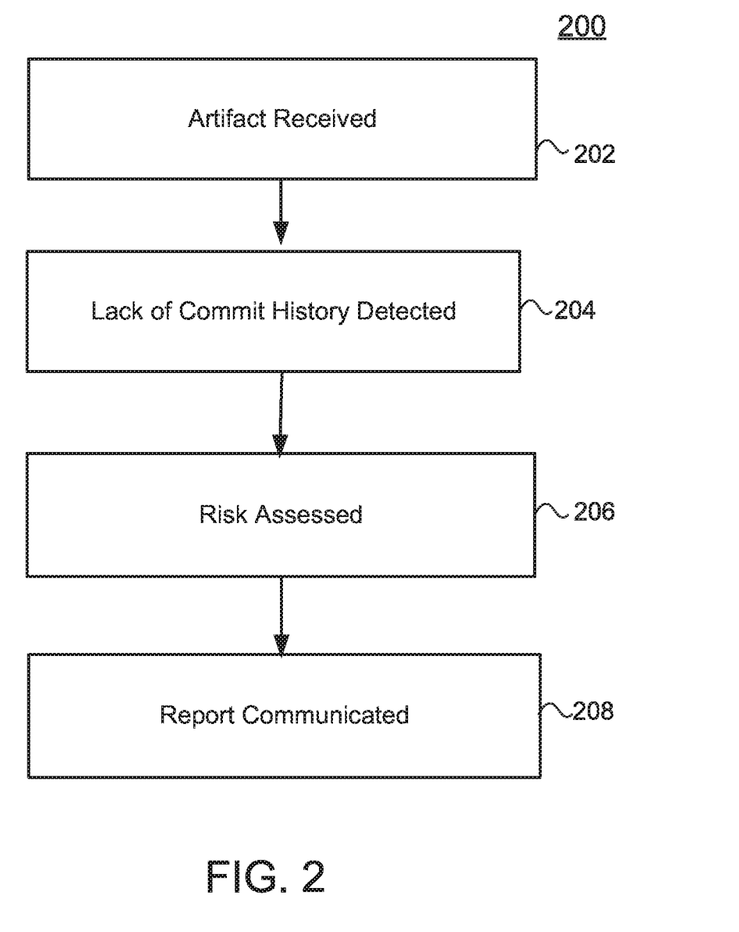
FIG. 2 shows a simplified flow diagram of a method according to an embodiment.

FIG. 2 is a flow diagram showing various actions taken in a method 200 according to an embodiment. At 202, a distributed artifact comprising files made up of lines is received.

At 204, the VCS is queried to determine a lack of any existing commit history for a line of the distributed artifact. At 206, a risk probability of malicious character of the line is assessed.

At 208, an analysis report including suspicious line of code is communicated to a user. That user is free to conduct additional manual review.

Further details regarding malicious software detection, are now provided in connection with particular examples of code in the JAVA and PYTHON computer languages, as available from the Maven Central and PyPI repositories for open source projects.

Example

Package repositories may support the distribution of artifacts produced in the context of open source projects. A typical example is a Java archive with Java bytecode that has been produced (compiled) from the Java source code maintained in a project's source code repository.

During software development, application developers can declare that an application requires (i.e., depends on) open source components. A dependency manager is responsible for:

automatically collecting those declarations,
understanding indirect (transitive) dependencies,
resolving conflicting requirements,
downloading the respective artifacts from package repositories, and
installing the artifacts in the development environment.

Depending upon conditions that may include but are not limited to:

the particular programming language,
the dependency manager,
the application, and
others, the code of those artifacts can be executed upon artifact installation, during application tests, at application runtime, or at other times.

A common feature of some attacks, is that malicious code exists only in the open source artifacts downloaded by dependency managers from package repositories. The malicious code does not exist in the source code repository of the open source project.

Figure 3:
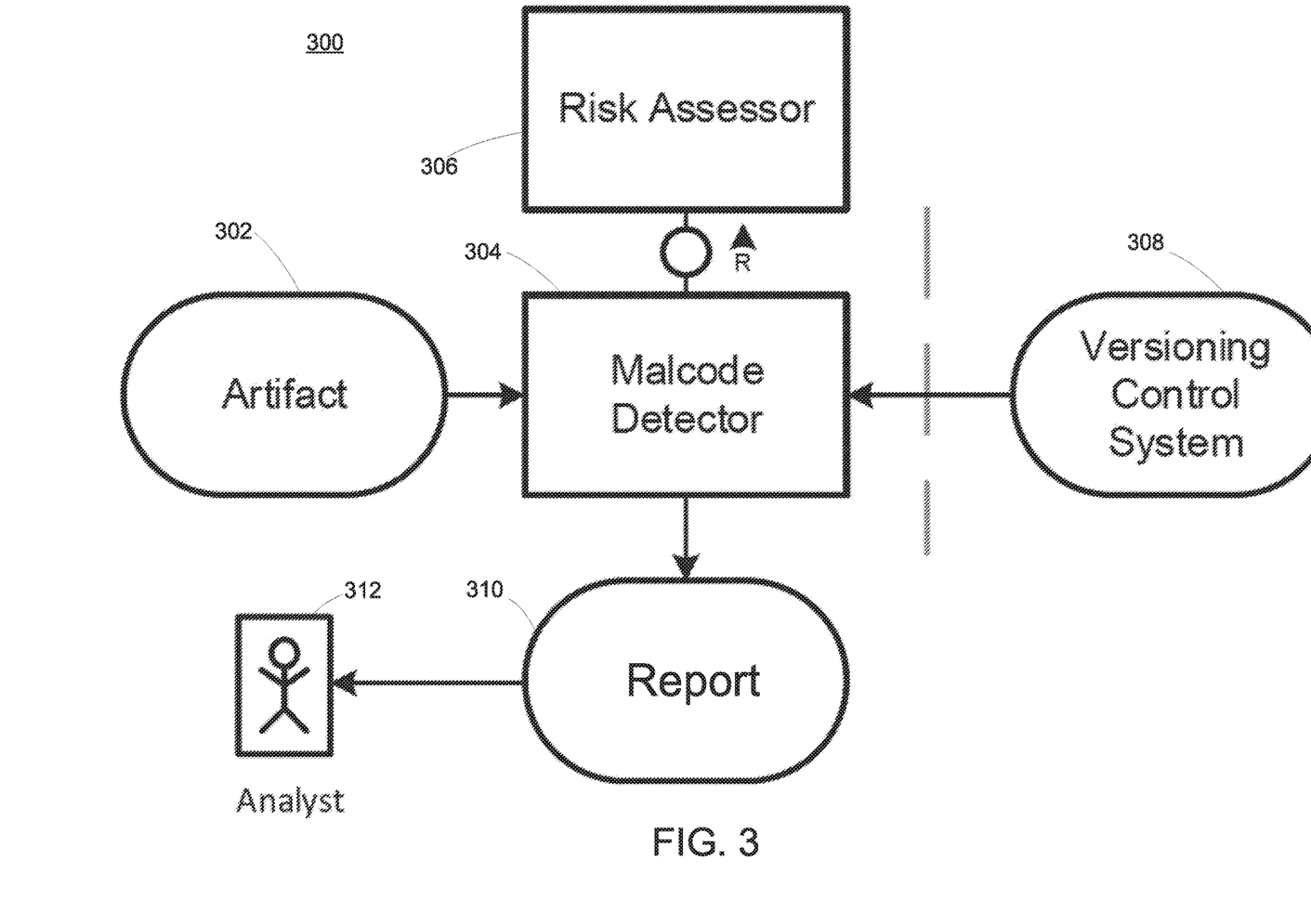
FIG. 3 is a simplified block diagram illustrating an overview of a system according to an example.

Accordingly, FIG. 3 illustrates a high-level overview of the core components of a system 300 according to the example. This system is involved in the detection of malicious code in open source components using the commit history of versioning control systems.

The artifact 302 represents a set of files developed in the context of an open source project. The artifact is typically distributed using a compressed archive. The artifact may be downloadable from a package repository (e.g., PyPI).

The malcode detector 304 examines all lines of all files of an artifact under analysis, in order to determine all content (lines in files) that is not subject to versioning control. An example of this procedure is outlined in the pseudo code presented later below.

The risk assessor 306 considers various features of the respective files and lines, in order to establish whether such content is malicious or not. Examples of such features that may be considered, can include but are not limited to:

the file extension,
the presence of security-critical API calls, or
the presence of obfuscation techniques.

Still more sophisticated approaches could involve the application of machine learning or artificial intelligence techniques to predict whether the features (e.g., letter or n-gram frequencies) of the given line correspond well with other lines and files of the same author, project, and/or project type.

The Versioning Control System (VCS) 308 (e.g., Git or SVN), maintains historical information regarding changes in files belonging to the open source project. Some of these changes are assumed to be copied as-is (or with minimal modifications) into the distributed artifact during the build process. This historical information is also referred to herein as the commit history.

Historical information comprises information about the actual change. That information can reflect one or more of:

addition of files;
removal of files; and
file modifications (including information about lines added/removed);
the author of the change; and
the timestamp of the change.

The VCS of open source projects typically resides on a publicly accessible remote machine. One example is GitHub.com.

The report 310 of operation of the malcode detector, includes a risk-assessed set of all the code present only in the artifact, but not in the corresponding VCS.

The analyst 312 then performs a manual review of the report of the malcode detector. This manual review is to distinguish correct findings (true-positives) and erroneous findings (false-positives).

Specifically, benign and legitimate reasons may exist for adding new files to artifacts during a build process. Moreover, there are benign and legitimate reasons to add new lines (statements) to files that are present in the source code repository. For these reasons, the results of the analysis may be manually reviewed by a subject matter expert.

A sample of pseudocode of the procedure performed by the malcode detector in this example, is presented below.

```
1   $unversioned_code = [ ]
2   For each $file in $artifact:
3       $versioned_file = locate($vcs, $file)
4       If $versioned_file:
5           For each $line in $file:
6               If not $line in commit_history($vcs, $versioned_file):
7                   Append ($file,$line) to $unversioned_code
8       Else:
9           For each $line in $file:
10              Append ($file,$line) to $unversioned_code
11  $result = assess_risk($unversioned_code)
```

Certain items appearing in this exemplary pseudocode are now noted. Specifically, in line 1, $unversioned_code is a set of tuples ($file, $line) signifying that the given line $line in the given artifact file $file is unknown (not subject to) version control.

In line 3, the function locate is used to find the $versioned_file in the versioning control system that corresponds to the file $file contained in the $artifact under analysis, and whose commit history provides information about its content changes. This search can rely on filename and path information as well as language-dependent heuristics (e.g., the file foo/__init__.py in the root folder of the artifact corresponds to the file src/main/foo/_init_.py in the versioning control system $vcs).

In line 4, where a corresponding file can be located, each line $line of file $file will be checked whether it is subject to version control (lines 5-6).

In line 6, where no commit exists in the commit history of $versioned_file with which the current line $line has been added, a new tuple will be appended to the set $unversioned_ code (lines 7-8).

In line 8, where no corresponding file can be located, each line $line of file $file will be added to the set $unversioned_ code (line 9-10).

In line 11, the function assess_risk is implemented by the risk assessor component illustrated in FIG. 3. The function performs a risk assessment of all the tuples in set $unversioned_code.

The risk assessment of all the un-versioned code represents the report of the artifact analysis. That risk assessment can be presented to an analyst for manual review. The need for manual review may depend upon the quality of the risk assessment function.

A specific sample architecture according to particular embodiments, is now described. Package repositories may contain on the order of millions of artifacts. An architecture according to this example is able to scan such numbers in a performant manner.

This ability is achieved primarily through one or more of the following features.

A distributed architecture scales the analysis process using a cluster of commodity computing nodes.

Optimizations allow skipping the processing of files and lines where unnecessary.

Analysis results are cached to avoid the repetition of expensive VCS operations.

Figure 4:
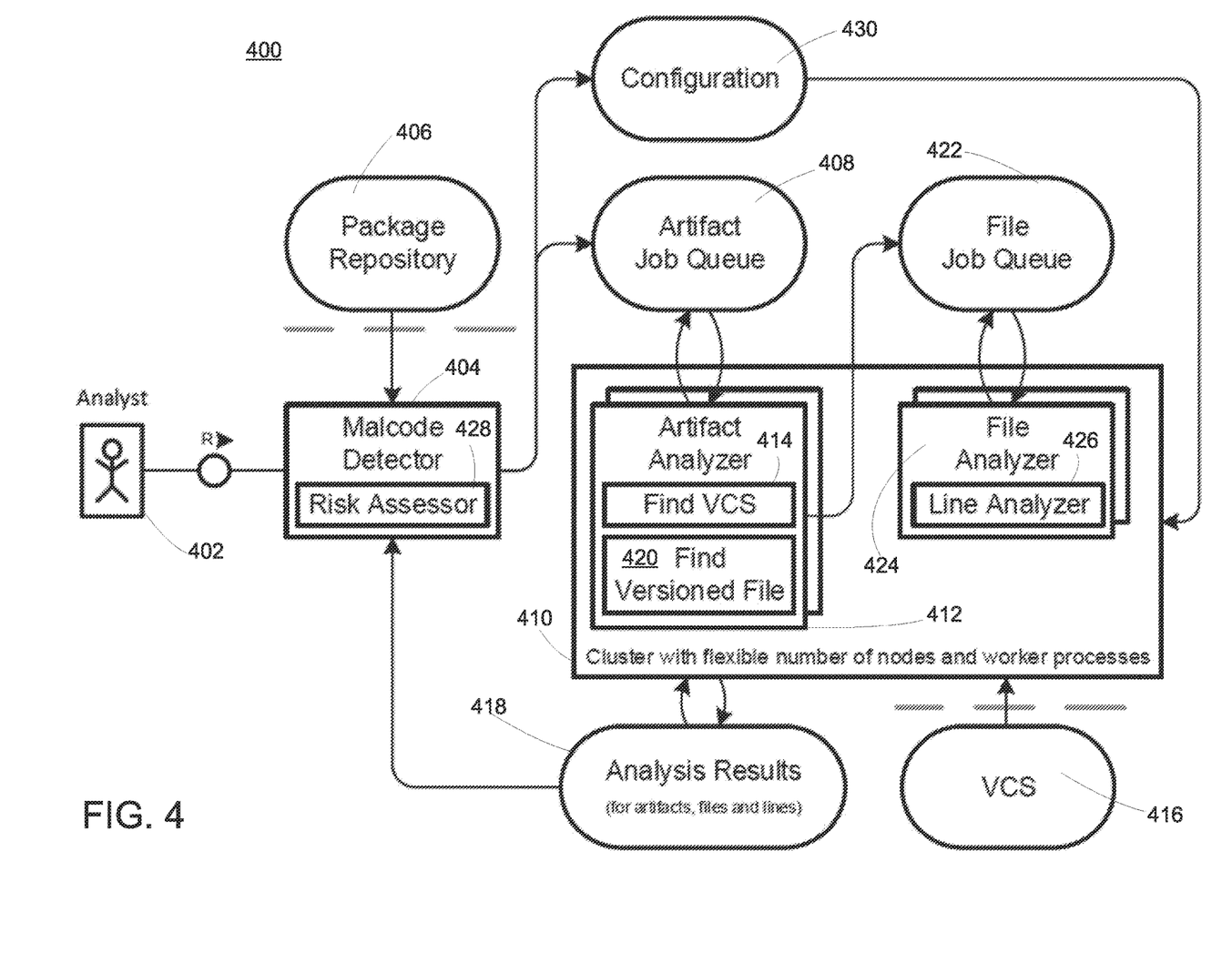
FIG. 4 is a diagram illustrating architectural details.

FIG. 4 illustrates a sample architecture 400 that is configured to analyze the lines of the files of all artifacts of a given package. Specifically, the Analyst 402 invokes Malcode Detector 404 to trigger the scan of a given package: e.g., the PyPI package "Requests".

The Malcode Detector calls a Package Repository 406 (such as PyPI) in order to learn about all the artifacts belonging to that package. The PyPI Requests package, for example, has more than one hundred and thirty releases (e.g., 0.0.1-2.9.2), each release associated to one or more artifacts (e.g., "requests-2.5.3-py2.py3-none-any.whl", or "requests-2.5.3.tar.gz").

For each artifact to be analyzed, the Malcode Detector creates an entry in the Artifact Job Queue 408. Moreover, configuration settings are written to the Configuration database 430 such that it is available to the distributed jobs, e.g., file extensions that shall be ignored.

Jobs in the Artifact Job Queue are picked up by worker processes running on the computing nodes of a cluster 410. The number of worker processes per node, as well as the number of nodes in the cluster, is flexible. This permits scaling-out of available resources such that many packages and artifacts can be processed in parallel.

When a worker process picks up an artifact analysis job, it runs the Artifact Analyzer 412. That Artifact Analyzer downloads a single artifact from the package repository.

The Find VCS element 414 searches for the URL of the VCS 416 from which the artifact was supposedly built. That URL may be metadata available within the artifact, or can be read from a dedicated resource if not available as metadata.

The Artifact Analyzer then loops over all files as exemplified in the above pseudocode. To increase efficiency of analysis, file types known to not contain executable code (e.g., files with the extension "txt") may be assumed harmless and skipped.

In order to avoid redundant file analyses, the digest of the file at hand is computed (e.g., its SHA1 hash), and it is checked whether a file with this digest has already been processed in the past. This condition is possible, since files with identical digests can exist in different artifacts belonging to the same or different package releases.

This redundancy check is performed by querying the Analysis Results 418. The Analysis Results comprise a remotely accessible database storing analysis results of artifacts, files and individual lines.

If a file is to be analyzed, the component Find Versioned File 420 implements the locate function explained in the above pseudocode. If the Find Versioned File is successful, a new entry in the File Job Queue 422 is created.

If the Find Versioned File is not successful, it is not possible to locate a corresponding file in the VCS. This indicates that the entire file has been added during the build process, which is reflected in the Analysis Results.

When a worker process picks up a file analysis job, it runs the File Analyzer 424. To prevent the expensive processing of every line, it is first checked whether a file in the VCS with the exact same digest ever previously existed.

If this checking reveals a previous VCS file with the same digest, the whole file is known to the VCS. Hence, the individual lines do not need to be processed.

If the checking does not indicate a previous VCS file with the same digest, the lines are analyzed one after other by the Line Analyzer 426.

In the particular sample architecture depicted in FIG. 4, the Line Analyzer runs in the same process as the File Analyzer. However, this is not required and alternatively the Line Analyzer can also be implemented as independent and asynchronous job (just like Artifact Analyzer and File Analyzer). Such an implementation may improve performance.

To avoid redundant line analyses, the Line Analyzer checks if the Analysis Results already contain a result for the given line in a file with the given digest. Such circumstances can arise because the same line can exist multiple times in the same file of the artifact, as well as in the corresponding file of other artifacts.

If a line is to be analyzed, it is checked whether the line contains executable (e.g., potentially malicious) code. This checking is achieved by using configurable patterns read from Configuration 430.

These configurable patterns can indicate comments and other non-executable content of source code developed in different programming languages. If executable code is found, the commit history of the file is read to check whether the given line has ever been added as part of a commit.

If executable code is not found, the respective line has been added as part of the build process. This is reflected in the Analysis Results.

Once all artifact and file analysis jobs have been completed, the Malcode Detector collects all results from the Analysis Results. The Risk Assessor 428 performs the risk assessment regarding the probability that code unknown to the VCS, is in fact malicious.

For the particular example shown in FIG. 4, the Risk Assessor runs within the process of the Malcode Detector. According to alternative embodiments, however, the Risk Assessor could be a stand-alone process on the same or a different system.

While the above example and corresponding use cases have been described in connection with Java and Python, this is not required. Alternative embodiments could check for malicious code in other software languages.

For example, certain programming languages and systems utilize the executable code existing in identical form in both the source code repository and the distributed artifact. However, the source code of other languages (e.g., C/C++) can be compiled, minimized, transpiled or otherwise transformed when included in a distributed artifact.

Returning to FIG. 1, there the particular embodiment depicted with the engine responsible for malicious code detection as being located outside of the storage layer. However, this is not required.

Rather, alternative embodiments could leverage the processing power of an in-memory database engine (e.g., the in-memory database engine of the HANA in-memory database available from SAP SE), in order to perform various functions.

Figure 5:
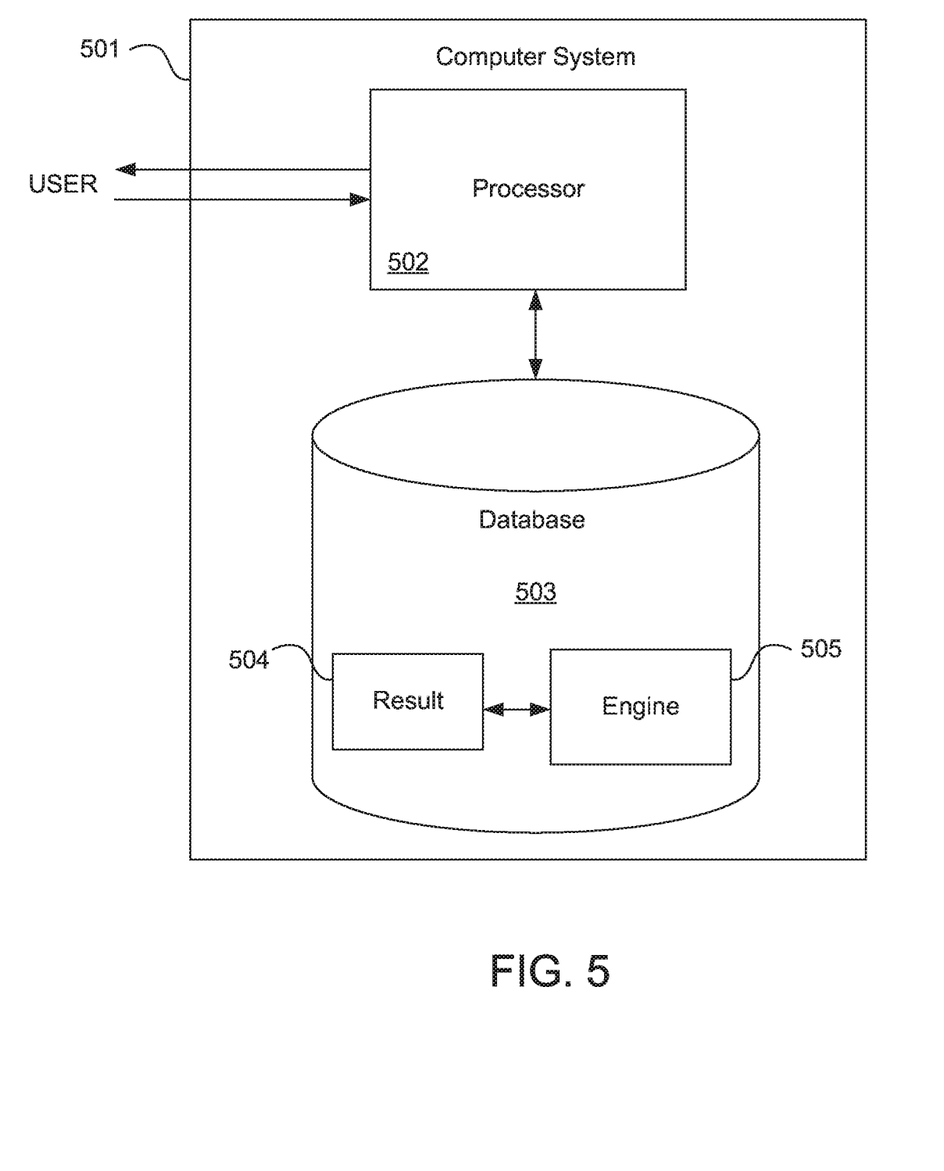
FIG. 5 illustrates hardware of a special purpose computing machine according to an embodiment that is configured to implement malicious component detection.

Thus FIG. 5 illustrates hardware of a special purpose computing machine configured to implement malicious code checking according to an embodiment. In particular, computer system 501 comprises a processor 502 that is in electronic communication with a non-transitory computer-readable storage medium comprising a database 503. This computer-readable storage medium has stored thereon code 505 corresponding to an engine. Code 504 corresponds to a stored result. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
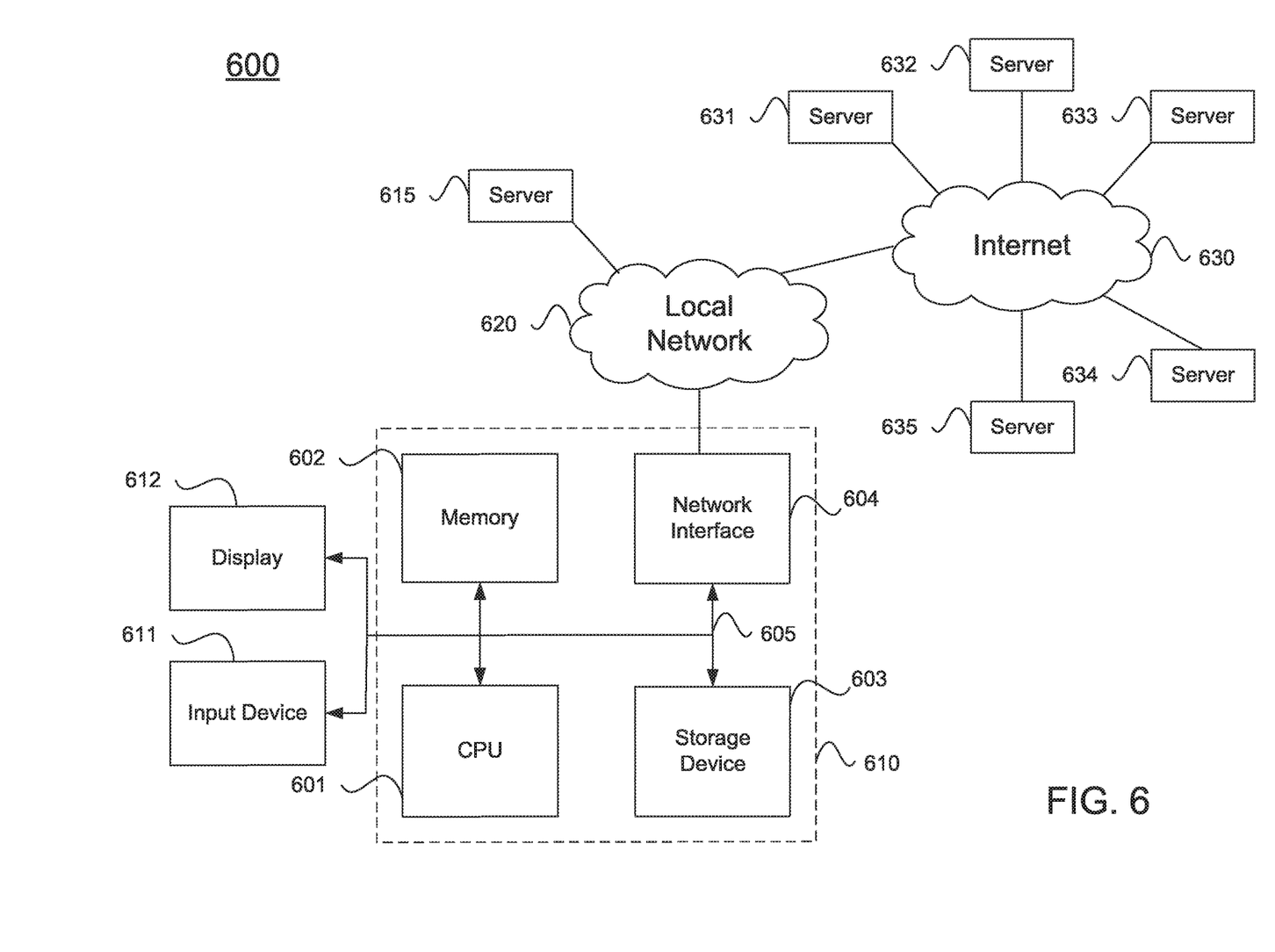
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving an artifact comprising a set of software code files, wherein each software code file in the set of software code files comprises a plurality of source code lines in a programming language;
   determining, for each software code file in the set of software code files of the artifact, whether a file under analysis in the set of software code files corresponds to a versioned file that is in a Version Control System (VCS), wherein the versioned file comprises a commit information;
   in response to determining the file under analysis does correspond to the versioned file, determining, for each source code line in the plurality of source code lines of the file under analysis, whether a source code line under analysis is in the commit information of the versioned file by:
      issuing a query to the VCS based on the source code line;
      receiving a response to the query comprising the commit information of the versioned file from the VCS;
      reading the commit information line by line;
      detecting that the source code line under analysis is not in the commit information of the versioned file in the VCS;
      generating a first malicious probability for the line under analysis based on the file under analysis and the line under analysis;
   in response to determining the file under analysis does not correspond to the versioned file in the VCS, generating a second malicious probability for each source code line of the file under analysis based on the file under analysis and each source code line of the file under analysis; and
   communicating each file under analysis, each source code line under analysis, and one of the first malicious probability and the second malicious probability corresponding to each source code line under analysis of each file under analysis for review.

2. A method as in claim 1 wherein the generating is based upon a presence in the source code line under analysis of the file under analysis of at least one of:
   a file extension;
   a security-critical API call; and
   an obfuscation technique.

3. A method as in claim 1 wherein the generating is based upon a stored configurable pattern.

4. A method as in claim 1 wherein the generating is based upon a machine learning technique.

5. A method as in claim 1 wherein determining whether the file under analysis corresponds to the versioned file that is in the VCS further comprises locating the versioned file in the VCS based on filenames, path information, and programming language-dependent heuristics.

6. A method as in claim 1 wherein the source code line under analysis of the file under analysis is identical to another source code line of a file present in a source code repository.

7. A method as in claim 1 wherein:
   a non-transitory computer readable storage medium comprises an in-memory database; and
   the detecting is performed by an in-memory database engine of the in-memory database.

8. A method as in claim 1 wherein the source code line under analysis of the file under analysis and one of the first malicious probability and the second malicious probability are included in an analysis report, the analysis report including one or more of:
   the source code line under analysis within the file under analysis;
   a line number of the source code line under analysis within the file under analysis;
   an identifier of the file under analysis.

9. A method as in claim 1 wherein the Version Control System maintains historical information reflecting one or more of addition of files, removal of files, file modifications, an author, and a timestamp.

10. A method as in claim 1 wherein the detecting is further based upon determining that the source code line under analysis of the file under analysis contains executable source code by consulting a configuration database containing information relating to patterns indicative of malicious software code.

11. A non-transitory computer readable storage medium embodying a computer program for performing a method, said method comprising:
   receiving an artifact comprising a set of software code files, wherein each software code file in the set of software code files comprises a plurality of source code lines in a programming language;
   determining, for each software code file in the set of software code files of the artifact, whether a file under analysis in the set of software code files corresponds to a versioned file that is in a Version Control System (VCS), wherein the versioned file comprises a commit information;
   in response to determining the file under analysis does correspond to the versioned file, determining, for each source code line in the plurality of source code lines of the file under analysis, whether a source code line under analysis is in the commit information of the versioned file by:
      issuing a query to the VCS;
      receiving a response to the query comprising the commit information of the versioned file from the VCS;
      reading the commit information line by line;
      detecting that the source code line under analysis is not in the commit information of the versioned file in the VCS;
      generating a first malicious probability for the line under analysis based on the file under analysis and the line under analysis;
   in response to determining the file under analysis does not correspond to the versioned file in the VCS, generating a second malicious probability for each source code line of the file under analysis based on the file under analysis and each source code line of the file under analysis; and
   communicating each file under analysis, each source code line under analysis, and one of the first malicious probability and the second malicious probability corresponding to each source code line under analysis of each file under analysis for review,
   wherein the generating is based upon a presence in the source code line under analysis of the file under analysis of at least one of:
      a file extension;
      a security-critical API call; and
      an obfuscation technique.

12. A non-transitory computer readable storage medium as in claim 11 wherein the generating is further based upon a stored configurable pattern.

13. A non-transitory computer readable storage medium as in claim 11 wherein the generating is further based upon a machine learning technique.

14. A non-transitory computer readable storage medium as in claim 11 wherein determining whether the file under analysis corresponds to the versioned file that is in the VCS further comprises locating the versioned file in the VCS based on filenames, path information, and programming language-dependent heuristics.

15. A non-transitory computer readable storage medium as in claim 11 wherein:
   the non-transitory computer readable storage medium comprises an in-memory database; and
   the detecting is performed by an in-memory database engine of the in-memory database.

16. A computer system comprising:
   one or more processors;
   a software program, executable on said computer system, the software program configured to cause an in-memory database engine of an in-memory source database to:
      receive an artifact comprising a set of software code files, wherein each software code file in the set of software code files comprises a plurality of source code lines in a programming language;
      determine, for each software code file in the set of software code files of the artifact, whether a file under analysis in the set of software code files corresponds to a versioned file that is in a Version Control System (VCS), wherein the versioned file comprises a commit information;
      in response to determining the file under analysis does correspond to the versioned file, determine, for each source code line in the plurality of source code lines of the file under analysis, whether a source code line under analysis is in the commit information of the versioned file by:
         issuing a query to the VCS;
         receiving a response to the query comprising the commit information of the versioned file from the VCS;
         reading the commit information line by line;
         detecting that the source code line under analysis is not in the commit information of the versioned file in the VCS;
         generating a first malicious probability for the line under analysis based on the file under analysis and the line under analysis;
      in response to determining the file under analysis does not correspond to the versioned file in the VCS, generate a second malicious probability for each source code line of the file under analysis; and communicate each file under analysis, each source code line under analysis, and one of the first malicious probability and the second malicious probability corresponding to each source code line under analysis of each file under analysis for review.

17. A computer system as in claim 16 wherein the in-memory database engine generates the malicious probability based upon presence in the source code line under analysis of the file under analysis of at least one of:

a file extension;

a security-critical API call; and an obfuscation technique.

18. A computer system as in claim 16 wherein the in-memory database engine generates the malicious probability based on a stored configurable pattern.

19. A computer system as in claim 16 wherein the in-memory database engine generates the malicious probability based on a machine learning technique.

20. A computer system as in claim 16 further comprising the in-memory database engine persisting the malicious probability.

\* \* \* \* \*